United States Patent Office 3,153,568
Patented Oct. 20, 1964

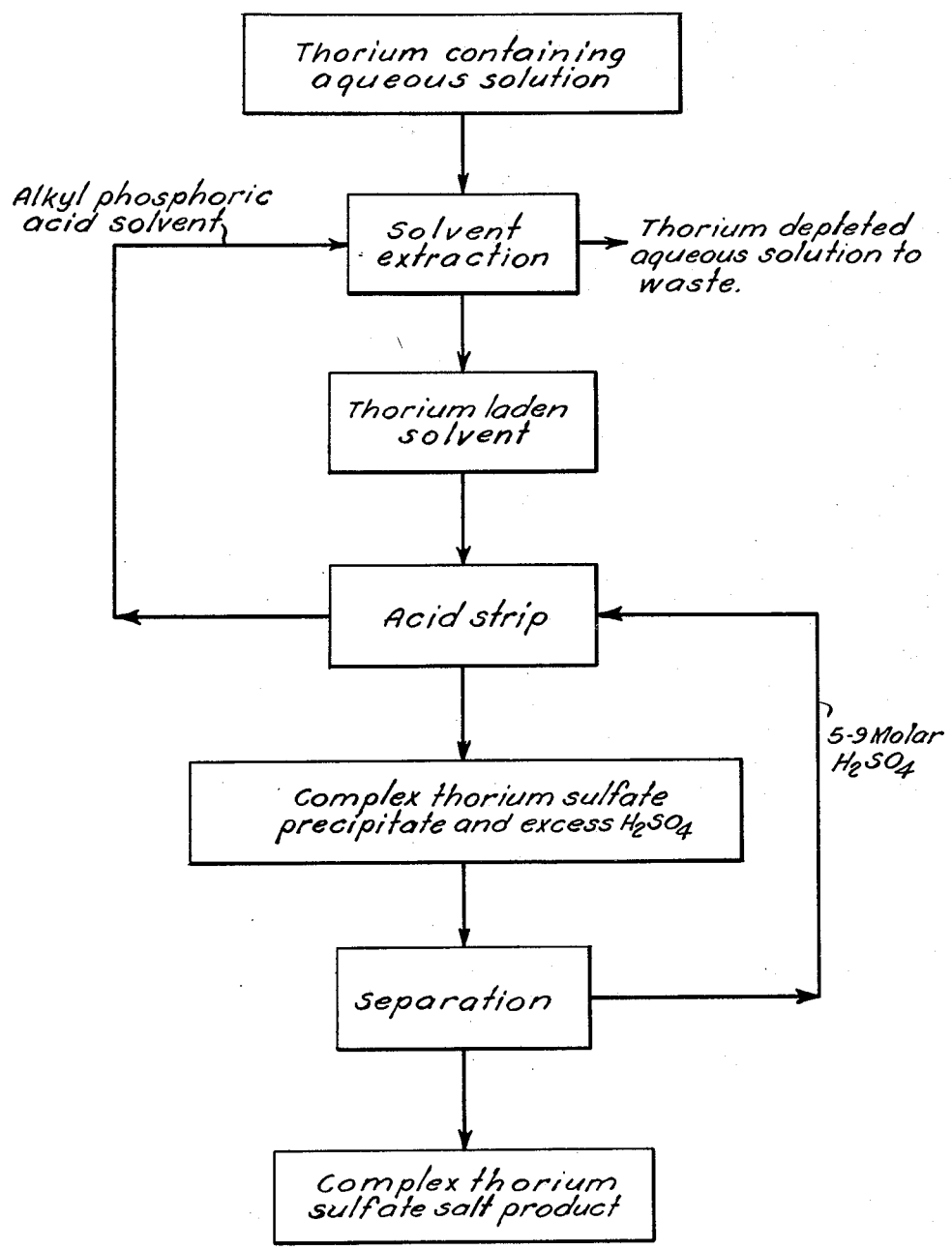

3,153,568
THORIUM RECOVERY
Robert S. Olson, Walnut Creek, Kernal G. Shaw, Concord, and Joseph P. Suris, Jr., Pleasant Hill, Calif., assignors to The Dow Chemical Company, Midland, Mich., a corporation of Delaware
Filed June 8, 1960, Ser. No. 34,687
3 Claims. (Cl. 23—14.5)

This invention relates to a process for recovering thorium values and more particularly is concerned with a process for the recovery of such values dissolved in aqueous solution utilizing a substantially water-immiscible alkyl substituted phosphoric acid extraction solvent followed by direct precipitation of the so-extracted thorium values from the extract.

In the processing of thorium bearing ores, minerals, concentrates, salts and the like by mineral acids or other materials, frequently there results an aqueous solution containing dissolved thorium values. Also, solutions containing valuable thorium result from the acid pickling of thorium containing metal alloy products and from the acidic dissolution of scrap metals containing thorium.

The recovery or removal of the soluble thorium from such solutions by presently known recovery methods poses many problems particularly when other materials or compounds are present from which the thorium can be separated only with difficulty. Now, unexpectedly, the present invention presents a new, novel and useful economic method for the recovery of thorium values dissolved in water.

It is a principal object of the present invention to provide a solvent-extraction method for the recovery of thorium from acidic or essentially neutral aqueous solutions containing dissolved thorium values. It is a further object of the invention to provide an economical method for recovery of dissolved thorium values without using expensive precipitation reagents which are lost for recycling after they have once been used to precipitate thorium from a solution. Another object of this invention is to provide a method of recovering thorium values dissolved in a crude aqueous solution containing these values by extraction of the solution with a water-immiscible solvent as well as the subsequent conversion of the so-extracted values into a variety of useful, high purity thorium compounds. An additional object of the method of the present invention is to provide a practical method for the recovery of thorium values dissolved in aqueous solutions by means of a liquid-liquid extraction system having few mechanical operating procedures.

Still other objects and advantages will become apparent from the specification and claims when considered in connection with the accompanying drawing which shows one process demonstrating certain embodiments of the invention.

The FIGURE is a flow-type diagram representing one process for the recovery of thorium from an aqueous solution containing dissolved thorium values.

In carrying out the process of the present invention, an aqueous solution containing from about 0.01 to more than several hundred grams per liter of dissolved thorium values is contacted with an organic, substantially water-immiscible monoalkyl or dialkyl substituted phosphoric acid extraction solvent for a period of time sufficient to preferentially extract substantially all of the thorium from the aqueous medium into the organic solvent. The two layers then are separated and the water layer discarded. The substituted phosphoric acid layer containing the so-extracted soluble thorium values then is treated with an appropriate acidic aqueous solution containing sufficient fluoride or sulfate anions thereby to transform the thorium values respectively into an insoluble fluoride or sulfate form which associates with the aqueous phase. After separation of the extractant and the aqueous phase, the resulting precipitated thorium product may be removed from the aqueous phase by conventional techniques, e.g., filtration, centrifugation and the like.

In the extraction method of this invention, thorium can be recovered from any acidic or essentially neutral solution where the thorium is present as a soluble material even in the presence of chloride, bromide, iodine, nitrate, sulfate, oxlate and phosphate anions as well as metallic cations such as titanium, iron, aluminum and rare earth metals in addition to other anionic or cationic constituents. Typical thorium containing solutions from which the thorium values may be recovered by the process of this invention are, for example, acidic sulfate byproduct solutions from uranium ore processing, and, acidic nitrate and acidic chloride solutions such as may result from the processing of ores and the pickling of metals.

Alkyl substituted phosphoric acids useful as extraction solvents in this process are the substantially water insoluble mono- and dialkyl substituted ortho phosphoric acids of the general formulae:

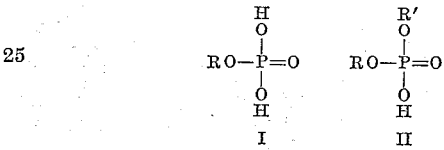

wherein each R and R' is an alkyl group containing from 2 to about 20 carbon atoms, and, preferably, from about 8 to about 17 carbon atoms. These mono- or dialkyl substituted acids can be used in the process either individually or as mixtures.

Preferably the amount of the alkyl phosphoric acid extractant solvent used is an amount to be at least stoichiometrically equivalent to the thorium content of the solution to be extracted; i.e., four moles of the extractant for each mole of thorium to be extracted. Smaller amounts of extractant will result in lowered recovery of thorium while amounts of the solvent greatly in excess of the thorium present will result in uneconomical operation except in those instances where the thorium is recovered in the presence of impurities which may coextract or interfere with the extraction of thorium. In these latter situations, use of amounts of solvent of at least the combined stoichiometric equivalent of the thorium and affected impurities is desired in order to obtain optimum recovery of thorium.

The phase ratio of the aqueous solution to the extractant solvent can range from about 1:3 to about 100:1 on a volume basis.

If desired, the extractant may be dissolved or carried in a diluent. Suitable diluents are those reasonably water-or aqueous solution immiscible materials in which both the extractant and thorium values are soluble, e.g., kerosene, aliphatic hydrocarbons, aromatic hydrocarbons, halogenated aliphatic and aromatic hydrocarbons, fuel oils, ethers and the like. In general, a concentration range of from about 0.02 mole to about 1 mole or more of the alkyl phosphoric acid extractant solvent dissolved in each liter of solution is useful while in common operations a concentration of from about 0.05 to about 0.8 mole of the alkyl phosphoric acid extractant per liter of solution preferably will be used.

In this process, the contact time between the thorium containing aqueous solution and the extractant may vary from about 0.05 minute to about 1 hour or more. The actual extraction operation can be carried out in batch or continuous operation using, for example, simple mixing tanks, mixer-settlers, direct or counter current flow columns, centrifugal contactors or other similar conventional type equipment known to one skilled in the art. The temperature range for carrying out the process is not critical and may vary widely over a range wherein the thorium containing feed liquor and extractant are both liquids.

Following separation of the immiscible organic and aqueous phases the extracted thorium values are removed from the extract according to the method of the present invention by contact of certain inorganic chemicals with the thorium bearing organic extractant solvent whereby thorium products are precipitated and become associated with the aqueous phase. For example, adding ammonium hydrogen fluoride solution of about 3 molar concentration, an aqueous hydrogen fluoride solution of about 2 molar concentration or a solution of aqueous hydrogen fluoride-metal fluoride (e.g., 5.5 M HF—0.14 M $NH_4F$) to the extract solution precipitates the thorium as a fluoride salt; adding sulfuric acid of about 5 molar to about 9 molar concentration to the solution precipitates the thorium as a thorium sulfate. After separation of the substantially thorium depleted extractant phase for recycle, the precipitated thorium products are seperated from the aqueous phase by conventional filtration, centrifugation or other similar means.

Examples of specific aqueous acidic fluoride solutions useful for stripping the thorium values from the alkyl phosphoric acid extract are solutions containing: (1) hydrogen fluoride, (2) hydrogen fluoride and a soluble fluoride salt, or (3) a combination of a strong mineral acid and a soluble fluoride salt, e.g., aqueous hydrogen acid, aqueous hydrogen and ammonium fluoride, aqueous hydrogen fluoride and ferric fluoride, aqueous hydrogen fluoride and aluminum fluoride, aqueous hydrogen fluoride and titanium fluoride, aqueous hydrogen fluoride and sodium fluoride, aqueous sulfuric acid and sodium fluoride, aqueous nitric acid and potassium fluoride, aqueous hydrochloric acid and ammonium fluoride, or combinations of these.

The upper concentration of hydrofluoric acid to be used in the stripping operation necessarily is limited to that concentration below which there is no appreciable decomposition of the alkyl phosphate extract. Generally, the aqueous solutions will contain from about 2–10 moles of hydrogen fluoride per liter, while solutions containing from about 5 moles per liter hydrogen fluoride on a weight basis are preferred.

The concentration of fluoride salt utilized in the salt containing mixtures is limited in concentration only by the solubility of the individual salt in the specific hydrogen fluoride containing solution. Operable ranges of salts will be from about 0.02–2.0 moles per liter (as based on fluoride ion) with a concentration of about 0.2 mole per liter preferred (on basis of fluoride ion content of salt member).

Ordinarily, sulfuric acid of from about 5 to 9 molar, and preferably from about 6 to 7 molar is used to precipitate the thorium values from the organic extractant. However, a less concentrated acidic sulfate containing solution can be used to precipitate the thorium into the aqueous phase if the sulfuric acid is saturated with an alkali metal sulfate salt; e.g. $Na_2SO_4, K_2SO_4$; $Rb_2SO_4$ or $Cs_2SO_4$. With such mixed saturated salt-acid solutions a total minimum sulfate anion concentration of from about 2.5–4 molar is needed to precipitate the thorium values as the alkali metal thorium double sulfate salt. At lower concentrations of the sulfuric acid alone, i.e. about 4 molar or less, the thorium distribution between the organic extraction solvent and the aqueous sulfuric acid stripping agent becomes less favorable towards the acid. Use of concentrated sulfuric acid solutions above about 9 molar leads to appreciable decomposition of the alkyl phosphate ester solvent.

The contact time between the aqueous acidic stripping solution and the thorium laden alkyl substituted phosphoric acid extract can be from about 0.5 minute to about 60 minutes or more although preferably this time will be from about 5 to about 15 minutes.

The thorium sulfate or fluoride salt as precipitated from an extract solution which does not contain appreciable amounts of interfering cationic or anionic impurities is of a high purity. High purity thorium compounds also can be precipitated directly from values extracted from waste liquors and process solutions containing interfering dissolved and solid contaminants if alternative process steps and/or solution pretreatments are incorporated into the recovery process.

Pretreatment of such thorium containing crude aqueous solutions prior to the solvent extraction may be employed if desired, both to increase the thorium extraction and/or to decrease the coextraction of impurities along with the thorium. For example, titanium, in some solutions, may be precipitated by heating the solution, which precipitate may or may not be removed prior to extraction of the thorium. Also, the acid content of a solution may be adjusted by addition of excess acid or a base, e.g., hydrochloric acid or ammonia, to improve the over-all process results. The undesirable coextraction of ferric ion along with the thorium can be repressed by addition of hydrochloric acid or chloride salts to the solution to complex the ferric ion, by minimizing contact time, or, the ferric ion can be reduced to the less extractable ferrous state by addition of metallic iron, zinc, aluminum, sodium sulfide or bisulfide, sodium hydrosulfite or other reductants.

Impurities commonly found in such waste solutions and which are not removed by the pretreatment of the aqueous solution but which are coextracted with the thorium by the extraction solvent, for example, iron, yttrium, rare earth metals, hexavalent uranium, aluminum, bismuth, cadmium, and tin may be removed from the extract prior to the precipitation of thorium by scrubbing the so-loaded solvent with certain strong mineral acids or strong mineral acid-inorganic salt solutions which will remove these impurities without removing appreciable amounts of thorium. For example, a strong acid member selected from the group consisting of hydrochloric acid from about 2 to about 12 molar, sulfuric acid from about 0.1 to about 4 molar and nitric acid from 1 to about 15 molar may be used to scrub the solution and strip various impurities from the solvent prior to the precipitation of the thorium. Single contact, multiple contact and countercurrent contact methmods may be used to treat the extract solvent with the scrubbing solution. Contact times ranging from about 1 minute to about 60 minutes at phase ratios from about 1:1 to 20:1 on the basis of organic extractant to aqueous scrubbing solution satisfactorily removes the impurities from the extractant solvent. For example, by use of a hydrochloric acid scrubbing solution (containing 30 percent hydrogen chloride by weight) to scrub and strip such impurities from the thorium laden extract, the subsequently precipitated thorium fluoride or sulfate as precipitated is of high purity grade suitable for use in nuclear applications. It is also recognized that following the treatment of the extract, the scrub solution itself may be purified by conventional techniques to render it suitable for recycle or reuse.

Additionally, the alkyl phosphate extractant solvent may be scrubbed, following the stripping of the thorium therefrom, to remove certain residual dissolved impurities remaining therein which would interfere with further extraction upon recycle of the thorium free stripped solvent, and, which were not removed by the scrubbing of the solvent prior to the thorium removal. For example, uranium (tetravalent), titanium, scandium, zirconium, hafnium and plutonium (tetravalent) are not removed in appreciable quantities from the solvent either by the hydrochloric acid or other pre-thorium precipitation acidic scrubs. Of these, the tetravalent uranium and plutonium, if present, are coprecipitated with the thorium in a sulfate stripping operation, leaving titanium, scandium, zirconium and hafnium in the extract. These latter listed contaminants are removed along with the thorium if the thorium is precipitated as the fluoride. If the thorium has been removed as the sulfate, the contaminants can be stripped from the extract solvent by scrubbing the solvent with a fluoride containing solution of the type described heretofore.

The following example will serve to further illustrate the invention, but is not meant to limit it thereto.

EXAMPLE

Crude waste solution from a uranium recovery process with dissolved ionic values as shown in Table I was taken for thorium recovery.

Table I

| Dissolved constituent: | Concentration, g./l. |
|---|---|
| Thorium | 0.175 |
| Uranium oxide ($U_3O_8$) | 0.02 |
| Iron (ferric) | 0.60 |
| Iron (ferrous) | 0.60 |
| Titanium | 0.04 |
| Sulfate | 12.00 |
| Chloride | 0.30 |
| Rare earth (total) | 0.13 |

This solution was passed upflow at an ambient temperature of about 20° C. through a packed bed about 18 inches thick of approximately 20 mesh iron particles. The flow rate of the solution through the bed, was equal to about 6 gallons solution per minute per square foot of bed.

The resulting iron reduced solution was fed into a continuous laboratory size mixer-settler at a feed rate of about 15 milliliters per minute simultaneously along with mono-heptadecyl phosphoric acid extraction solvent at about 1.5 milliliters per minute. The extract was added as a solution in kerosene which contained about 0.15 mole of the substituted phosphoric acid per liter of solution. The two phases were mixed by a mechanical agitator operated at a speed of about 580 revolutions per minute for a mixing residence time of about 1 minute.

The phases then were permitted to settle for several minutes in the settler portion of the apparatus after which time the layers were separated. Analysis of the waste aqueous portion prior to its disposal indicated a residual thorium content of about 0.04 gram per liter.

The organic extractant thorium containing solution was found to have a thorium concentration of about 1.94 grams per liter which indicated a thorium distribution radio (solvent/aqueous solution) of about 50 to 1 and a thorium recovery of about 80 percent.

The extractant was then scrubbed with 10 M HCl at a 10/1 (extractant/acid) phase ratio to strip impurities which would contaminate the thorium product.

Sulfuric acid (7 molar) then was admixed with the scrubbed extractant at a phase ratio of about 4/1 (extractant/sulfuric acid), for a total mixing time of about 3 minutes. A precipitate was formed, which after separating and drying, upon analysis was shown to be a complex thorium sulfate corresponding to the formula $Th(SO_4)_2 \cdot H_2SO_4 \cdot 8H_2O$. Substantially 100 percent recovery of thorium values in the extractant was achieved.

In a manner similar to that described for the preceding examples, di, 2-ethylhexyl phosphoric acid (0.8 molar dissolved in toluene) can be used to extract dissolved thorium values from an acidic aqueous nitrate solution at about 5 minutes' contact time and the so-extracted thorium values be recovered by treating the thorium loaded di, 2-ethylhexyl phosphoric acid extractant with a 4 molar sulfuric acid solution saturated with rubidium sulfate for about 1 minute thereby to precipitate the thorium. Also, 0.1 molar mono-heptadecyl phosphoric acid can be used to extract dissolved thorium values from a neutral aqueous sulfate solution at about 2 minutes contact time and the so-extracted thorium values can be recovered by treating the thorium loaded monoheptadecyl phosphoric acid with an aqueous phase of sulfuric acid (2.6) molar saturated with potassium sulfate (0.8 mole) for about 5 minutes to precipitate the potassium-thorium double sulfate. Monopropyl phosphoric acid extractant (0.5 molar dissolved in mineral spirits) may be contacted with an acidic chloride solution containing dissolved thorium values for about 3 minutes to extract the thorium therefrom and the thorium can be recovered by precipitation as a thorium ammonium double fluoride from the extractant by contacting for about 0.5 minute the extractant with an aqueous hydrogen fluoride (5.5 M)-ammonium fluoride (0.14 M) solution. Similarly, a 2.5 molar aqueous hydrogen fluoride solution can be used to precipitate thorium values dissolved in a monohexadecyl orthophosphoric acid extract.

Various modifications can be made in the present invention without departing from the spirit or scope thereof, for it is understood that we limit ourselves only as defined in the appended claims.

We claim:

1. A process for recovery of thorium values dissolved in a water solution which comprises; contacting said solution with iron whereby ferric ion is reduced to the less extractable ferrous state, separating the reduced solution from said iron, contacting for about 1 minute said reduced solution with about a 0.15 molar solution of monohexadecyl phosphoric acid dissolved in kerosene, wherein at least four molar equivalents of said monohexadecyl phosphoric acid are present for each molar equivalent of thorium values dissolved in said reduced solution, separating the thorium laden monohexadecyl phosphoric acid from the substantially thorium depleted water solution, scrubbing said thorium laden phosphoric acid with hydrochloric acid, said hydrochloric acid being from 2 to about 12 molar, separating said thorium laden phosphoric acid from said hydrochloric acid, contacting said scrubbed and separated thorium laden monohexadecyl phosphoric acid with sulfuric acid of from about 5 to about 9 molar concentration from about 1 to 2 minutes, the amount of said sulfuric acid being at least stoichiometrically equivalent to the amount of said monohexadecyl phosphoric acid reacted with said thorium whereby said thorium values are precipitated, and, separating the precipitated thorium values from both the substantially thorium free monohexadecyl phosphoric acid and the sulfuric acid solution.

2. A process for recovering thorium values dissolved in a water solution which comprises; contacting said solution with a substantially water-immiscible alkyl substituted phosphoric acid extractant selected from the group consisting of mono- and dialkyl substituted orthophosphoric acids at least 4 molar equivalents of said alkyl substituted phosphoric acid being present for each molar equivalent of thorium values dissolved in said aqueous solution thereby to extract said thorium values from said aqueous solution into said alkyl phosphoric acid extractant, the alkyl groups of said substituted orthophosphoric acid each containing from 2 to about 20 atoms, contacting said thorium-laden extract with sulfuric acid of from about 5 to about 9 molar concentration thereby to precipitate the thorium values therefrom the amount of said sulfuric acid added being at least stoichiometrically equivalent to the amount of said alkyl substituted phosphoric acid reacted with said thorium values, and separating the precipitated thorium values from both the substantially thorium free alkyl substituted phosphoric acid extractant and said sulfuric acid.

3. A process for recovery of thorium values dissolved in a water solution which comprises: (a) contacting said solution with iron whereby ferric iron is reduced to the less extractable ferrous state, (b) separating the reduced solution from said iron, (c) contacting for a period of from 0.5 to about 60 minutes said reduced solution with a substantially water-immiscible alkyl substituted phosphoric acid extractant selected from the group consisting of mono- and dialkyl substituted orthophosphoric acids wherein the alkyl groups each contain from 2 to 20 carbon atoms and wherein at least four molar equivalents of said alkyl substituted phosphoric acid are present for each molar equivalent of thorium values dissolved in said reduced solution, (d) separating the thorium laden alkyl substituted phosphoric acid from the substantially thorium depleted water solution, (e) scrubbing said thorium laden substituted phosphoric acid with an aqueous solution of a strong mineral acid member selected from the group consisting of hydrochloric acid of from about 2 to about 12 molar, sulfuric acid of from about 0.1 to about 4 molar and nitric acid of from about 1 to about 15 molar, (f) separating said thorium laden phosphoric acid from said aqueous mineral acid, (g) contacting said scrubbed and separated thorium laden alkyl substituted phosphoric acid with sulfuric acid of from about 5 to about 9 molar concentration from about 0.5 to about 60 minutes, the amount of said sulfuric acid being at least stoichiometrically equivalent to the amount of said alkyl substituted phosphoric acid reacted with said thorium whereby said thorium values are precipitated, and (h) separating the precipitated thorium values from both the substantially thorium free alkyl substituted phosphoric acid and the sulfuric acid solution.

References Cited in the file of this patent

UNITED STATES PATENTS

| | | |
|---|---|---|
| 2,789,878 | Peppard | Apr. 23, 1957 |
| 2,859,092 | Bailes | Nov. 4, 1958 |
| 2,860,031 | Grinstead | Nov. 11, 1958 |
| 2,869,979 | Grinstead | Jan. 20, 1959 |
| 2,883,264 | Warf | Apr. 21, 1959 |
| 2,945,742 | Christensen | July 19, 1960 |
| 2,993,752 | Lewis | July 25, 1961 |